C. B. HATFIELD & C. B. HATFIELD, Jr.
STEERING MECHANISM FOR SELF PROPELLED VEHICLES.
APPLICATION FILED MAR. 12, 1910.
989,846.
Patented Apr. 18, 1911.
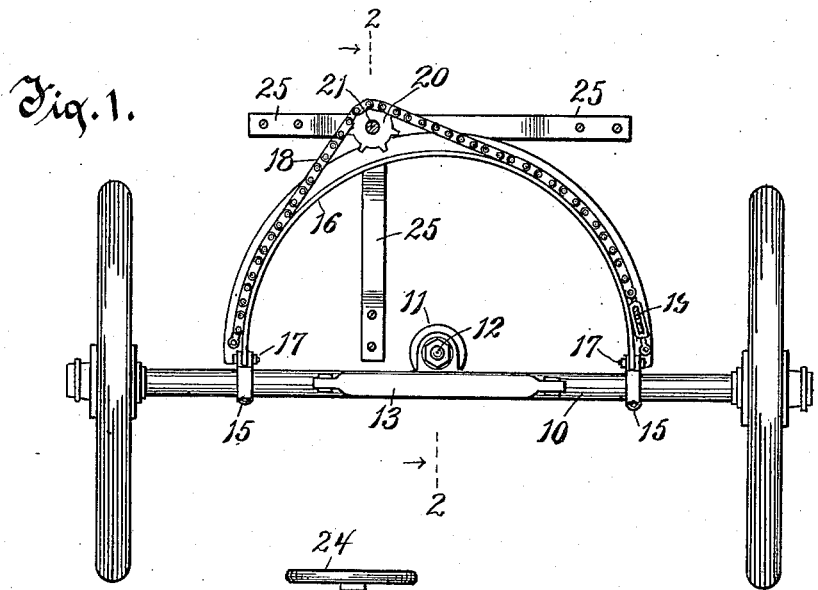
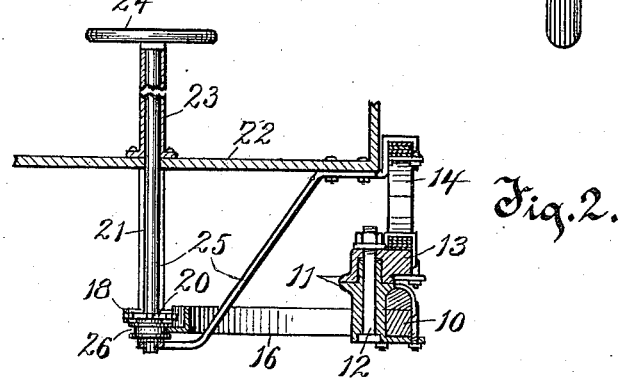
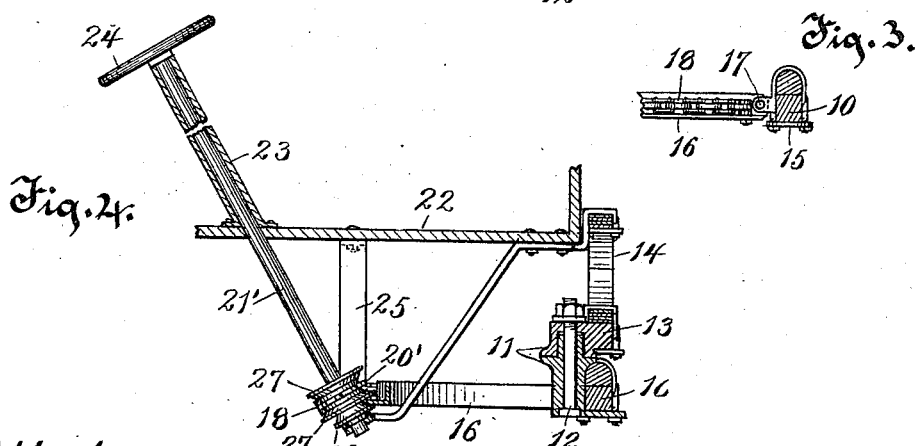

UNITED STATES PATENT OFFICE.

CHARLES B. HATFIELD AND CHARLES B. HATFIELD, JR., OF CORNWALL-ON-THE-HUDSON, NEW YORK, ASSIGNORS TO HATFIELD COMPANY, A CORPORATION OF NEW YORK.

STEERING MECHANISM FOR SELF-PROPELLED VEHICLES.

989,846.        Specification of Letters Patent.        Patented Apr. 18, 1911.

Application filed March 12, 1910. Serial No. 549,022.

*To all whom it may concern:*

Be it known that we, CHARLES B. HATFIELD and CHARLES B. HATFIELD, Jr., citizens of the United States, and residents of Cornwall-on-the-Hudson, Orange county, New York, have invented certain new and useful Improvements in Steering Mechanism for Self-Propelled Vehicles, of which the following is a specification.

This invention relates to steering mechanism for self-propelled vehicles and has for its object to improve upon the construction shown in Letters Patent No. 901,898 issued to C. B. Hatfield on October 20, 1908.

With the structure covered by the above mentioned Letters Patent an arc-shaped guide or bearing for a steering chain is rigidly connected with the pivoted front axle of the vehicle to constitute in effect a section of the fifth wheel with a bearing on the reach bars which necessitates a sliding connection between the sprocket wheel for the steering chain and the steering post. The present invention is designed to simplify and strengthen the construction by making the sprocket wheel fixed on the steering post with a flange for engaging the arc-shaped guide or bearing and by pivotally connecting said arc-shaped guide or bearing to the front axle so as to be capable of swinging with relation thereto to maintain its connection with the sprocket wheel notwithstanding the movements of the front axle and the body of the vehicle permitted by the cushioning springs.

Another object of the invention is to rigidly brace the steering post and its sprocket wheel from the body of the vehicle so that the connection between the arc-shaped guide or bearing and the flange of the sprocket wheel will enable the arc-shaped guide or bearing to serve the purpose of a radius rod for positioning the front axle.

Another object of this invention is to provide a simple steering mechanism of this character with an inclined steering post so that the steering wheel may be more convenient to the driver.

With the above and other objects in view the invention consists in the steering mechanism herein claimed.

Referring to the accompanying drawings in which like characters of reference indicate the same parts in the different views: Figure 1 is a plan view of a portion of the running gear of a self-propelled vehicle provided with a steering mechanism constructed in accordance with this invention; Fig. 2 is a sectional elevation thereof on the plane of line 2—2 of Fig. 1; Fig. 3 is a sectional detail view of the hinge connection between the arc-shaped guide or bearing and the front axle; and Fig. 4 is a view similar to Fig. 2 of a modified form of the invention where the steering post is in an inclined position.

In these drawings 10 indicates the front or steering axle of a vehicle running gear which is pivotally mounted on a cross bar 13 by means of a fifth wheel 11 on a king bolt 12, the cross bar 13 being connected to the vehicle body by means of a bow spring 14, all in the usual manner. On each side of the fifth wheel and at quite a distance therefrom the front axle is provided with clips 15 to which the ends of angle-iron-arc-shaped bearing or guide 16 are pivotally connected by pivot bolts 17 so that said guide or bearing is capable of swinging up and down on the front axle though turning therewith from side to side. This arc-shaped guide or bearing is so constructed that its vertical upwardly projecting flange forms a bearing for a steering chain 18 which is firmly connected at one end to one end of the guide or bearing in any suitable manner and is adjustably connected at the other end to the other end of the guide or bearing by means of a turn buckle 19. The steering chain is supported by the horizontal outwardly extending flange of the arc-shaped guide or bearing 16 and at one place leaves the guide or bearing to pass around and engage with the teeth of a sprocket wheel 20 on a steering post 21 which is mounted on the car body 22 with a guide sleeve 23 surrounding it and a steering wheel 24 secured to its upper end. The lower end of the steering post 21 is braced rigidly in place by a three-arm bracket or spider 25 secured to the under side of the vehicle body, and a flanged roller 26 on the steering post receives the horizontal flange of the arc-shaped guide or bearing 16 to hold said guide or bearing in its proper relation to the sprocket wheel 20 at all times. By this connection the parts are kept in operative relation to each other notwithstanding the variation in distance between the vehicle body and the front axle, for the arc-shaped guide or bearing 16 swings upon the front axle without leaving its engagement between the flanges of the roller 26 and without disturbing the engagement of the chain with the sprocket wheel. This connection further enables the arc-shaped guide or bearing 16 to position the front axle and prevent torsional strain upon the cushioning springs, said guide or bearing acting as a radius rod swinging on its rigid support formed by the steering post and the bracket 25 and holding the axle at its proper distance from said support. By tightening the turn buckle 19 the steering chain may be tightened to the desired extent for allowing the freedom of movement of the parts without unnecessary play.

A modification of this invention is shown in Fig. 4, wherein the steering post 21' is in an inclined position so that the steering wheel 24 is in a more convenient position for the driver. In this construction the sprocket wheel 20' is provided with flaring flanges 27 to prevent the chain losing its connection therewith and the flanged roller 26 is replaced by a single conical flange 28 to hold the horizontal flange of the guide or bearing 16 between it and the lower flange 27 in the same manner as is done by the flanged roller 26 in the other construction.

While it is contrary to usual practice to connect a chain member to a sprocket wheel which is tilted or inclined with relation to the plane of the chain, it is found in practice that such angularity of the parts as made in the present invention is practicable, and because of the guiding action of the horizontal flange of the guide or bearing 16 and also, in the structure shown in Fig. 4, because of the guiding action of flanges 27 the chain does not lose its connection with the sprocket wheel.

We claim—

1. A steering mechanism for self-propelled vehicles, comprising a steering axle pivotally mounted on a vehicle body, an arc-shaped guide pivotally connected to the axle, a steering post on the vehicle body held against vertical movement, a sprocket wheel on the steering post, and a chain passing around the guide and having connection therewith operatively engaging the sprocket wheel, said arc-shaped guide being supported from the vehicle body by means of the steering post, and means connected with the sprocket wheel to preserve the relative position of the guide therewith.

2. A steering mechanism for self-propelled vehicles, comprising a steering axle pivotally mounted on a vehicle body, an arc-shaped guide pivotally connected to the axle and provided with a horizontal flange, a steering post on the vehicle body, a sprocket wheel on the steering post, a chain passing around the guide resting on its horizontal flange and having connection therewith and engaging the sprocket wheel, and a flange on the steering post to engage the flange of the arc-shaped guide and support the same from the vehicle body.

3. A steering mechanism for self-propelled vehicles, comprising a steering axle pivotally mounted on a vehicle body, an arc-shaped guide pivotally connected to the axle and provided with a horizontal flange, a steering post on the vehicle body, a sprocket wheel on the steering post, a chain passing around the guide resting on its horizontal flange, and having connection therewith and engaging the sprocket wheel, a flange on the steering post to engage the flange of the arc-shaped guide and support the same from the vehicle body, and a bracket secured to the vehicle body and engaging the steering post to brace it against yielding to pressure of the arc-shaped guide, whereby said arc-shaped guide serves as a radius rod for the steering axle.

4. A steering mechanism for self-propelled vehicles, comprising a steering axle pivotally mounted on a vehicle body, an arc-shaped guide pivotally connected to the axle, an inclined steering post on the vehicle body, a sprocket wheel on the steering post, a chain passing around the guide and having connection therewith and operatively engaging the sprocket wheel, flaring flanges on the sprocket wheel to prevent the sprocket chain becoming disengaged therefrom, a flange on the arc-shaped guide for guiding and supporting the chain, and an annular flange on the steering post engaging the flange of the arc-shaped guide between it and a flange on the sprocket wheel.

Witness our hands this 4 day of March, 1910, at Cornwall on Hudson, N. Y.

CHARLES B. HATFIELD.
CHARLES B. HATFIELD, Jr.

Witnesses:
WILLIAM R. BAIRD,
STEPHEN S. NEWTON.

---

Copies of this patent may be obtained for five cents each, by addressing the "Commissioner of Patents, Washington, D. C."